Aug. 3, 1937.  G. W. SCOTT  2,088,815
FRUIT JUICER
Filed July 15, 1935
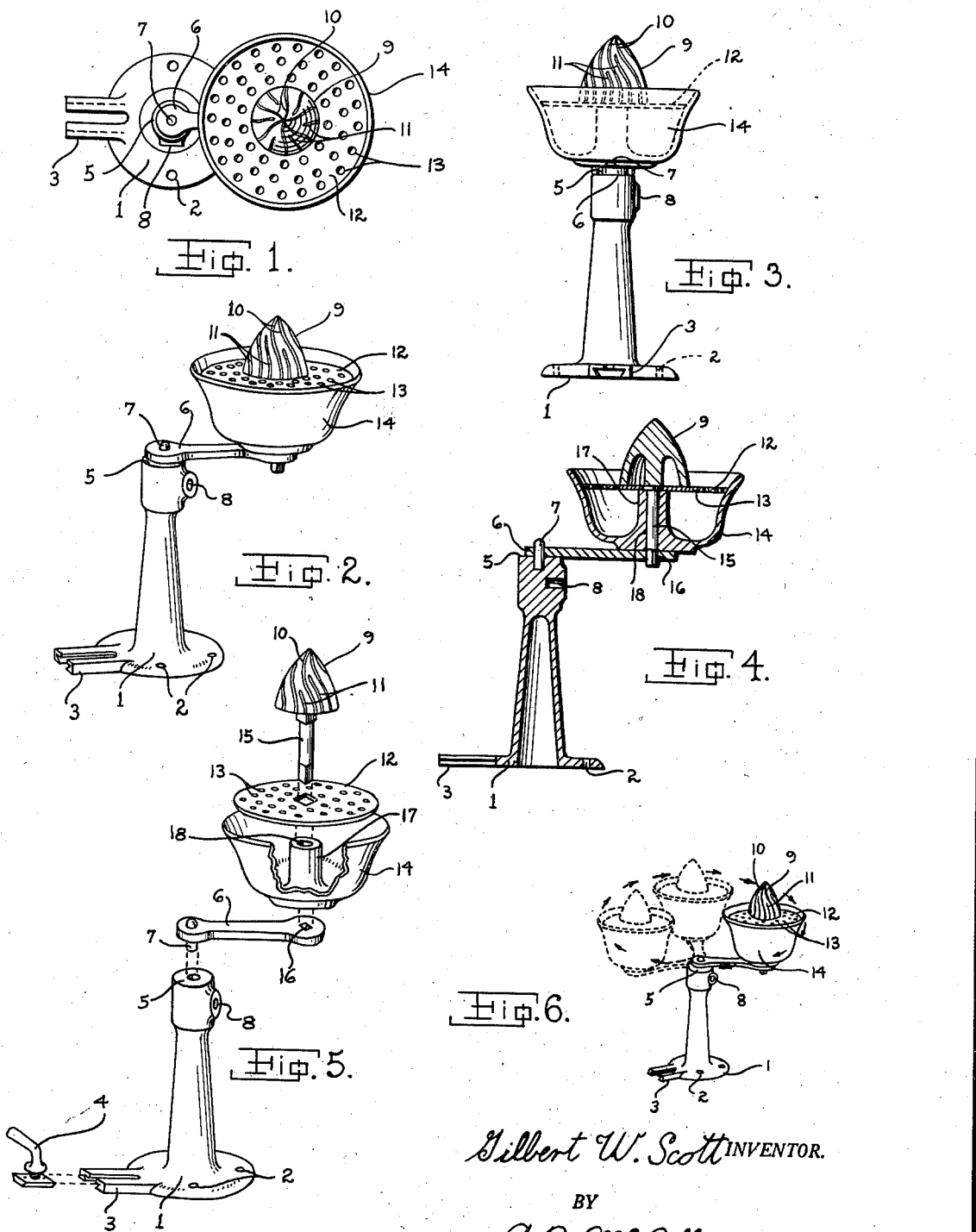
Gilbert W. Scott INVENTOR.
BY
A.B. McCall ATTORNEYS.

Patented Aug. 3, 1937

2,088,815

UNITED STATES PATENT OFFICE 2,088,815

FRUIT JUICER

Gilbert W. Scott, Jacksonville, Ill.

Application July 15, 1935, Serial No. 31,491

1 Claim. (Cl. 146—3)

My invention relates to devices for juicing fruits and more especially for extracting fruit juices from citrus fruit and the like where it may be desired to handle them at home and in a restaurant or such places where the operator may wish to secure said fruit juice in a manner permitting the juice to be separated at the time from the fibrous cell material of the fruit.

An object of my invention is to provide a simple and inexpensive fruit juicing device for homes and restaurants and the like which will be economical to handle, convenient to operate, attractive in appearance and detachable whether it is mounted on the wall or the table and wherever it is used, constructed in such a manner as will make it easy and convenient to disassemble, wash and re-assemble the parts thereof.

I attained the objects of my invention by the device described in the annexed specification, recited in the claims and illustrated in the accompanying drawing in which like reference numerals indicate like parts in the several figures.

Referring to the figures:

Figure 1 is a top view of my invention.

Figure 2 is a perspective view of my invention.

Figure 3 is an end view of my invention.

Figure 4 is a sectional view taken down through the middle from top to bottom of my invention, showing the fitting relation of the parts thereof.

Figure 5 is a detailed view showing how the juice extracting cone, the perforated plate and the juice receiving bowl are fitted together on the non-circular shaft adapted to operatively fit into the non-circular hole at the free end of the crank.

Figure 6 is a diagrammatic view showing the rotating action required for extracting juices with my device.

Referring now to the details of construction of my fruit juicer and to the preferred manner of operating the same, I provide as features new and novel in my invention those salient characteristics which I shall now point out as new features in conjunction with certain other features which may have been known before.

For instance, in my invention I provide a bracketed base member 1, provided in its construction with means for holding it on a wall or table either by fastening to bolt holes 2 or a clamp bracket 3 or a clamp member 4 would be used for holding the same detachably in place.

This bracket has a terminal bearing member 5 for pivotally supporting the crank 6 and crank pin 7 when bracket 1 is used on the table but when bracket 1 is mounted on a wall then crank pin 7 will rest in bearing 8 as it supports crank 6.

It will be noted that the fruit juicing cone 9 has spiral grooves 10 adjacent the top and spiral grooves 11 running to the bottom of this cone while perforated plate 12 is provided with holes 13 to permit the fruit juice to run therethrough down into bowl 14 which holds the fruit juice.

It will be further observed that fruit juicing cone 9 and perforated plate 12 are preferably held in fixed relation to each other on a non-circular shaft 15 which extends down to a non-circular hole 16 in crank 6.

It is obviously immaterial whether bowl 14 rotates in a rigid connection with non-circular shaft 15 or not so long as shaft 15 fits into the non-circular hole 16 of crank 6 but it is essential that juice extracting cone 9 be supported in fixed relation with non-circular shaft 15 while for construction purposes it may be found best to arrange perforated plate 12 on the same shaft in fixed relation with cone 9.

For the sake of construction also it is thought best to provide bowl 14 with a central upright hub 17 for the support of the juicing cone 9 and the perforated plate 12 and to permit shaft 15 to run down through the same.

If bowl 14 is to be left free of a uniformed rotation with non-circular shaft 15 then this shaft will be made round as it extends down through the central hole 18 in hub 17 and be made non-circular at the bottom end where it fits through non-circular hole 16 in crank 6.

If it should be desired in the manufacture of my invention bowl 14 may be made to rotate uniformly with non-circular shaft 15 in which case the central hole 18 in bowl 14 would also be non-circular.

In the operation of my invention it may be desired to use a larger bowl for grapefruits for instance, than for lemons but the construction would be the same regardless of size whether it be for extracting juices from oranges, lemons or grapefruit whether the variation in size was for the fruit juicing cone of the bowl or the perforated plate.

When the operator extracts juice he cuts the fruit and presses it down in the well known manner on cone member 9 and starts rotating the cone and bowl in a cranking motion about the pivoted crank pin 7 supporting crank 6 thus the fluted grooves 10 and 11 on cone 9 spirally work their way through the fruit tearing out the juice and the fibrous material therein as the bowl and cone are rotated about crank pin 7 on the crank 6 and the fruit juice thus runs down into bowl 14 through perforations 13 in plate 12.

When washing my fruit juicing device, the parts thereof may be dis-assembled by lifting cone 9 with plate 12 and shaft 15 out of their operative position thus releasing bowl 14 with its juicy contents if juice has been extracted while crank 6 may be lifted with crank pin 7 out of bearing 5 or side bearing 8 as the case may be and the bracket support 1 may be released by moving bolts from holes 2 in a table or wall or by turning clamp lever 4 to release clamp portion 3 from its engagement with the table or wall.

Thus the several detailed parts of my invention may be dis-assembled, washed and re-assembled without difficulty and wherever my invention may be used it may be manufactured and installed in a manner permitting the same to be attractive in appearance whether it is mounted on a table or wall for domestic use for a restaurant.

Having thus described the nature of my invention and the preferred manner of operating the same what I claim is:

A fruit juice extractor comprising a stand shaped to define a table support and a detachable wall bracket, a crank member operatively and pivotally supported detachably on said stand; said stand provided with a longitudinal terminal hole and a lateral hole for the selective pivotal support of said crank, a fruit juice extracting bowl, a center shaft about which said bowl may freely rotate, a juice extracting rough-surfaced cone fixed on said shaft at the top end thereof and the bottom end of said shaft shaped to define means for its fixed engagement with the terminal of said crank; said bowl, in its free rotation adapted to rest upon said terminal of said crank when in operation, and a perforated plate in the bowl below the cone member for separating fruit seeds from the juice.

GILBERT W. SCOTT.